United States Patent [19]

Uchiyama et al.

[11] Patent Number: 4,629,486
[45] Date of Patent: Dec. 16, 1986

[54] PROCESS OF HOW TO FABRICATE THE MICROCHANNEL PLATE

[75] Inventors: Toshiyuki Uchiyama; Takeo Sugawara; Chiyoshi Okuyama; Yoshihiko Mizushima, all of Hamamatsu, Japan

[73] Assignee: Hamamatsu Photonics Kabushiki Kaisha, Hamamatsu, Japan

[21] Appl. No.: 798,933

[22] Filed: Nov. 18, 1985

[30] Foreign Application Priority Data

Dec. 11, 1984 [JP] Japan .................. 59-261436

[51] Int. Cl.⁴ .............................................. F16C 1/06
[52] U.S. Cl. ........................................ 65/3.15; 65/4.3; 156/296
[58] Field of Search ................... 65/3.15, 4.3; 156/296

[56] References Cited

U.S. PATENT DOCUMENTS 3,341,730 9/1967 Goodrich et al. .............. 156/296 X
4,127,398 11/1978 Singer, Jr. .............................. 65/4.3
4,532,171 7/1985 Balkwill .......................... 156/296 X

FOREIGN PATENT DOCUMENTS 57-25934 6/1982 Japan.

Primary Examiner—Arthur Kellogg
Attorney, Agent, or Firm—Spencer & Frank

[57] ABSTRACT

Disclosed are the processes of how to fabricate the microchannel plate for use in electron image intensifying by using a number of glass pipes, each consisting of glass material containing oxides of alkaline earth metals, i.e., magnesium oxide (MgO) or a mixture of magnesium oxide (MgO) and calcium oxide (CaO).

2 Claims, 4 Drawing Figures

PROCESS OF HOW TO FABRICATE THE MICROCHANNEL PLATE

BACKGROUND OF THE INVENTION

The present invention relates to the processes of how to fabricate the microchannel plate for use in the image intensifier, UV ray detector, ion detector or charge particle detector.

The assignee of the present invention already filed a patent application in Japan, which was published as Japanese Patent Publication No. 25934/1982, entitled "Process of how to fabricate the microchannel plate". The summary of this published application is given as follows:

A glass core, which can be dissolved by acid, is covered with a glass cladding, which cannot be dissolved by acid, so as to make a single glass fiber. A plurality of the glass fibers are arranged in parallel and bound to form a bundle of glass fibers. These fibers are heated until the surfaces of these fibers are sintered to form a single bound structure.

After the process abovementioned, the glass fiber bundle can be sliced along the direction perpendicular to its optical axis so as to make a plate. The glass core can then be solved by acids, to form a bundle of pipes.

The glass clad, which cannot be dissolved by acid, contains 35 to 50 weight percents of silicon di-oxide ($SiO_2$); two to ten weight percents of one or more of sodium oxide ($Na_2O$), potassium oxide ($K_2O$) and lithium oxide ($Li_2O$); 30 to 55 weight percents of lead oxide (PbO) and 0.5 to 7.0 weight percents of one or more of titanium di-oxide ($TiO_2$) and zirconium di-oxide ($ZrO_2$).

The inner surfaces of the microchannel plate are activated by the other process and then a pair of electrodes are formed at both sides of the plate. This activated state is called the initial state. The initial microchannel plate is heated within a vacuum to exhaust gases therefrom during baking process.

The microchannel plate fabricated, activated and baked in accordance with the procedures mentioned above has a gain much lower than the value which can be obtained before the baking process. If we define the total output charge as an integral of the output current till the end of life, the microchannel plate has a total output charge of $1 \times 10^{-1}$ coulomb/cm$^2$, if the end of life is defined the time point when the gain becomes 50% of the gain immediately after the baking process.

FIG. 4 shows the gains of the microchannel plate in the respective steps of the fabrication processes in the above referred-to Japanese publication. The gain obtained after the baking process is 20 to 30% of the initial state microchannel plate.

Scrubbing process is that of actually operating the microchannel plate, after the baking process, and to strike electrons to the inner surface of the microchannel plate. After the scrubbing process, the gain of the microchannel plate decreases a little. The X-axis of the graph in FIG. 4 indicates the voltage across the microchannel plate electrodes.

The objective of the invention is to present the processes of how to suppress the decrease of the gain after the microchannel plate is baked within a vacuum and how to elongate the life of the microchannel plate.

SUMMARY OF THE INVENTION

The first process of how to fabricate the microchannel plate in accordance with the present invention consists of steps of sintering the surfaces of the glass fibers bound to form a bundle of the glass fibers, each consisting of a glass core which can be dissolved by acid and a glass clad covering the glass core, which cannot be dissolved by acid; forming a plate-like structure of the bundle by slicing the glass fiber bundle along the direction perpendicular to the optical axis thereof; dipping the structure into an acid solution so as to dissolve the glass cores which can be dissolved by acid; activating the inner surfaces of the microchannel plate, which are formed by dissolving by acid glass cores which can be dissolved by acid; forming a pair of electrodes at both ends of the plate-like structure: wherein the glass cladding which cannot be solved by acid contains the followings:

| | |
|---|---|
| Silicon di-oxide ($SiO_2$) | 35 to 50 weight percents |
| Sodium oxide ($Na_2O$) | 1 to 3 weight percents |
| Potassium oxide ($K_2O$) | 1 to 5 weight percents |
| Lithium oxide ($Li_2O$) | 0 to 2 weight percents |
| Magnesium oxide (MgO) | 1 to 5 weight percents |
| Lead oxide (PbO) | 30 to 55 weight percents |
| Zirconium di-oxide ($ZrO_2$) | 0.5 to 7 weight percents |

The second process of how to fabricate the microchannel plate in accordance with the present invention consists of the same steps as the above first process; wherein the glass cladding which cannot be dissolved by acid contains calcium oxide (CaO) as well as the materials with different contents. These are as follows:

| | |
|---|---|
| Silicon di-oxide ($SiO_2$) | 35 to 50 weight percents |
| Sodium oxide ($Na_2O$) | 1 to 3 weight percents |
| Potassium oxide ($K_2O$) | 1 to 5 weight percents |
| Lithium oxide ($Li_2O$) | 0 to 2 weight percents |
| Magnesium oxide (MgO) | 1 to 5 weight percents |
| Calcium oxide (CaO) | 1 to 5 weight percents |
| Lead oxide (PbO) | 30 to 55 weight percents |
| Zirconium di-oxide ($ZrO_2$) | 0.5 to 7 weight percents |

The second one containing both magnesium oxide (MgO) and calcium oxide (CaO) has superior response than the first one containing magnesium oxide (MgO) alone.

PREFERRED EMBODIMENTS

Figure 1:
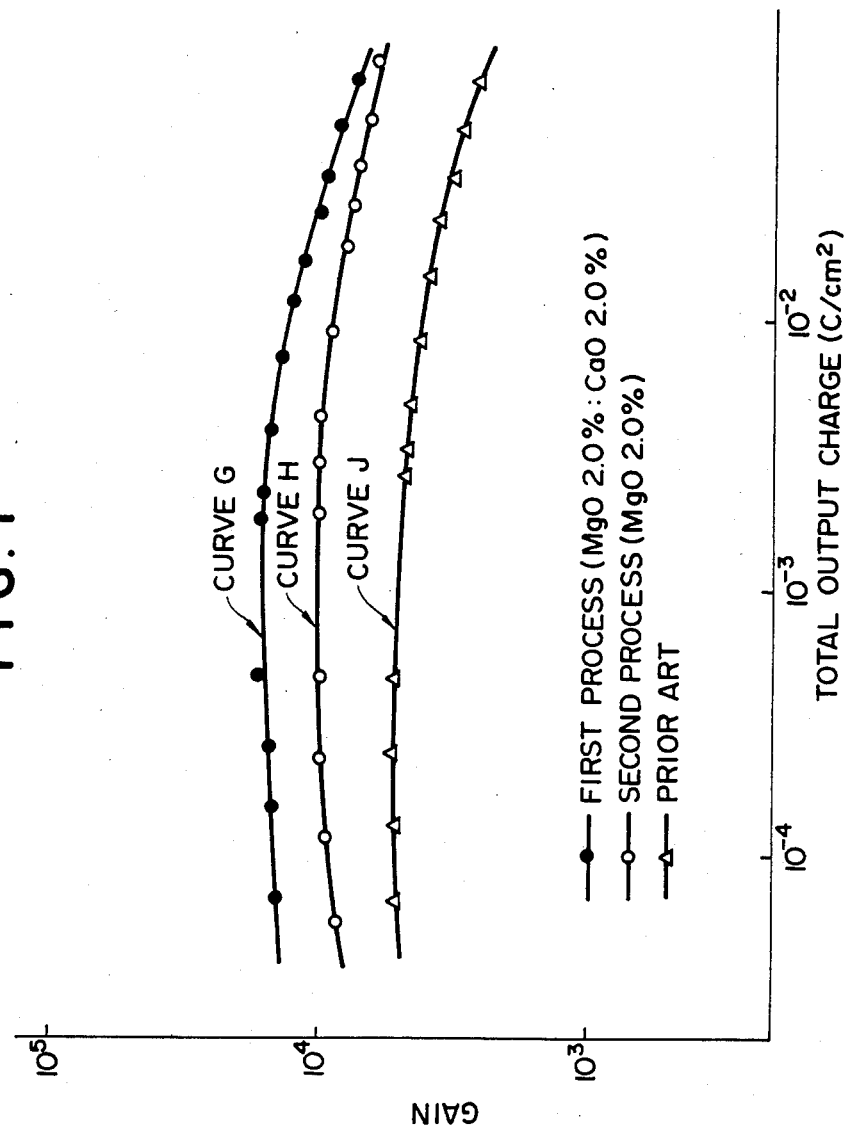
FIG. 1 is a graph showing the gains of the microchannel plates fabricated in accordance with the present invention, represented in terms of the total output charge.

The present invention will be described in detail referring to the drawings.

FIG. 1 shows the gains of the microchannel plates fabricated in accordance with the present invention, represented in terms of the total output charge. In FIG. 1, the gains of the microchannel plates fabricated in accordance with the present invention are compared with that fabricated in the conventional technique. The Figure shows the gains of the microchannel plates fabricated in accordance with the first process (Curve B), second process (Curve G) of this invention and conventional technique (Curve J). Curves H, G and J are plotted in terms of the total output charge which is defined as an integral of the output current with time.

The microchannel plate fabricated in accordance with the second technique of this invention has higher gain than that fabricated in accordance with the first process. The microchannel plate fabricated in each of the first and second processes has higher gain than that fabricated in accordance with the conventional techniques, and is capable of operating stably for a long period of time.

Different types of glass, glass type I containing no magnesium oxide (MgO), glass type II containing one weight percent of magnesium oxide (MgO) and glass type III containing two weight percents of magnesium oxide (MgO) were used to check if the magnesium oxide contents in the glass clad affect the output responses. The gains of the microchannel plates fabricated by using the different types of glass materials were measured when the voltage across a pair of electrodes for each microchannel plate was kept at 1000 V DC.

Figure 2:
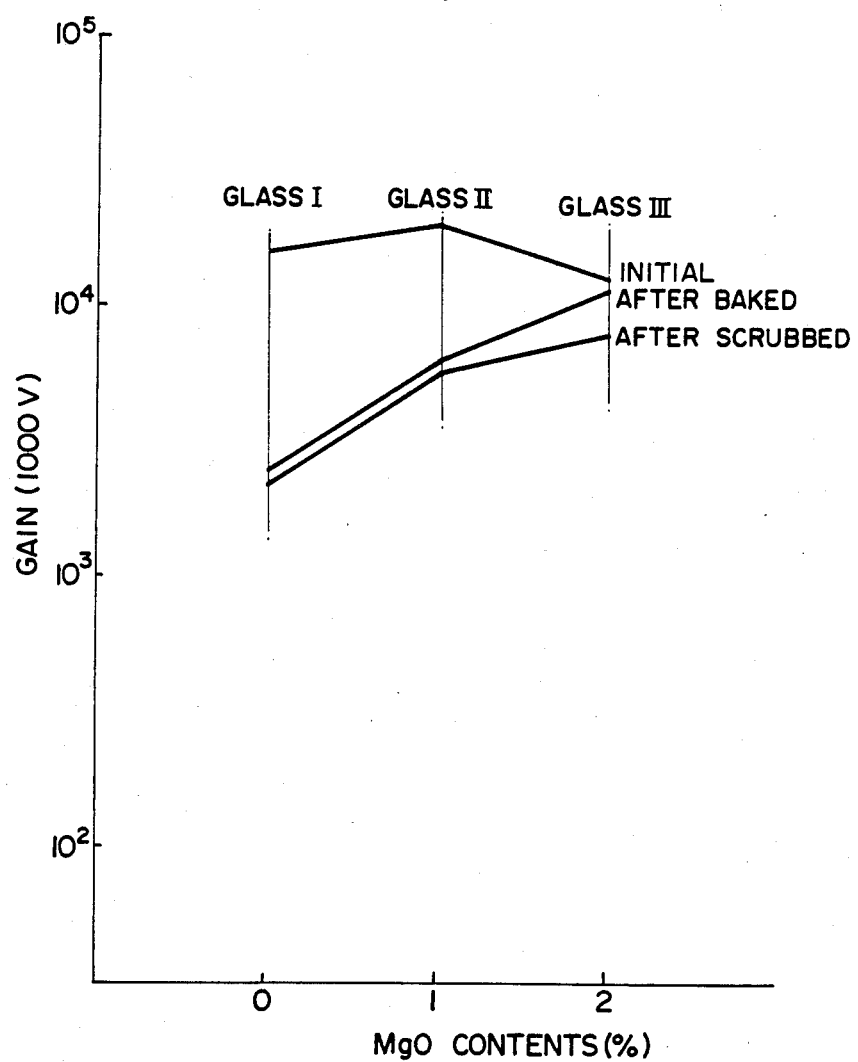
FIG. 2 is a graph showing the gains in terms of MgO contents in the initial state, after the baking step, and after the scrubbing step.

FIG. 2 shows the gains of these microchannel plates. The microchannel plate fabricated by using type I glass with no MgO contents corresponds to that fabricated in the conventional technique.

The microchannel plates were baked and scrubbed under the following conditions:
Baking process:
  Vacuum: $1 \times 10^{-6}$ torr
  Temperature and time: 350° C. for 50 hours
Scrubbing process:
  Input current: 20 nA
  Output current: 500 nA (adjusted by changing microchannel plate voltage)
  Time: 1 hour The initial state microchannel plate fabricated by using type I glass has almost the same gain as that fabricated by using other types of glass. However, the more the MgO contents decrease, the more the gain of the microchannel plate decreases after the microchannel plate is baked in the above condition. Glass materials of types I through III contain the followings:

| (TYPE I) | |
|---|---|
| Silicon di-oxide (SiO$_2$) | 44% |
| Sodium oxide (Na$_2$O) | 3.0% |
| Potassium oxide (K$_2$O) | 3.0% |
| Lithium oxide (Li$_2$O) | 1.5% |
| Magnesium oxide (MgO) | 0.0% |
| Lead oxide (PbO) | 44.5% |
| Zirconium di-oxide (ZrO$_2$) | 4% |
| (TYPE II) | |
| Silicon di-oxide (SiO$_2$) | 44% |
| Sodium oxide (Na$_2$O) | 3.0% |
| Potassium oxide (K$_2$O) | 3.0% |
| Lithium oxide (Li$_2$O) | 1.5% |
| Magnesium oxide (Mg0) | 1.0% |
| Lead oxide (PbO) | 43.5% |
| Zirconium di-oxide (ZrO$_2$) | 4% |
| (TYPE III used in the first Process) | |
| Silicon di-oxide (SiO$_2$) | 44% |
| Sodium oxide (Na$_2$O) | 3.0% |
| Potassium oxide (K$_2$O) | 3.0% |
| Lithium oxide (Li$_2$O) | 1.5% |
| Magnesium oxide (MgO) | 2.0% |
| Lead oxide (PbO) | 42.5% |
| Zirconium di-oxide (ZrO$_2$) | 4% |

Figure 3:
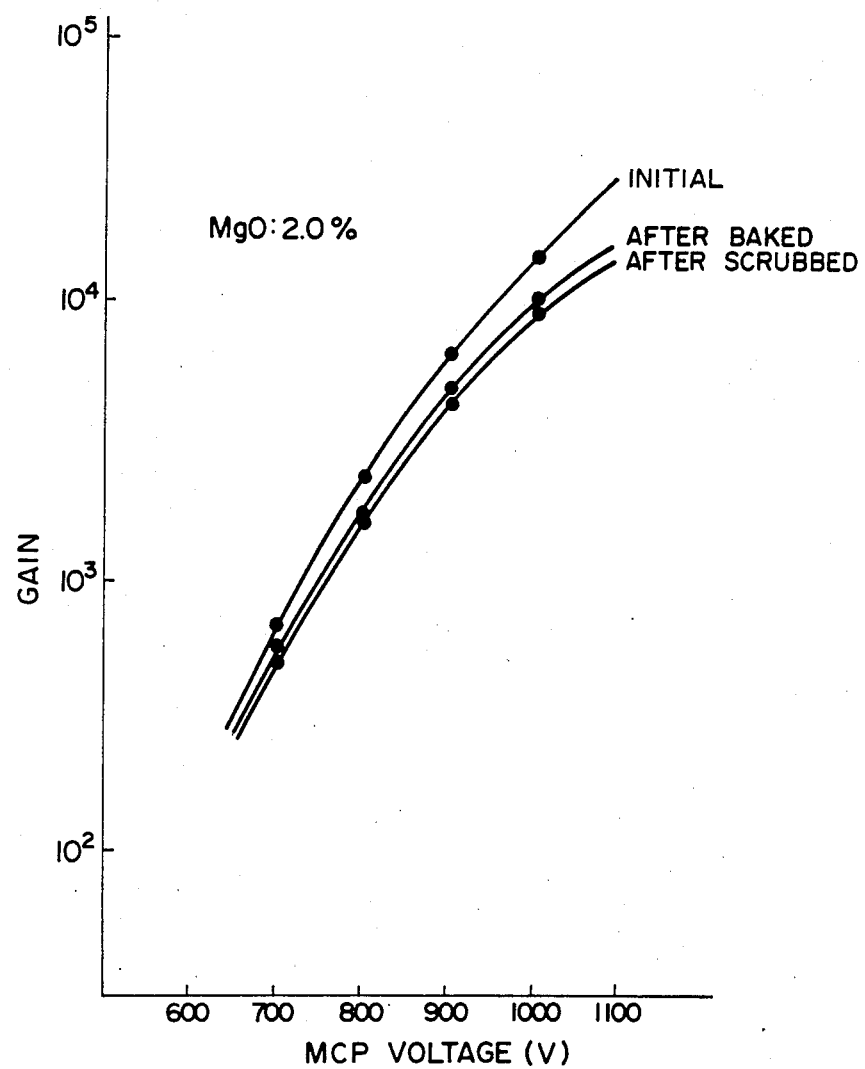
FIG. 3 is a graph showing the gains of the microchannel plates fabricated by a first process of this invention.
Figure 4:
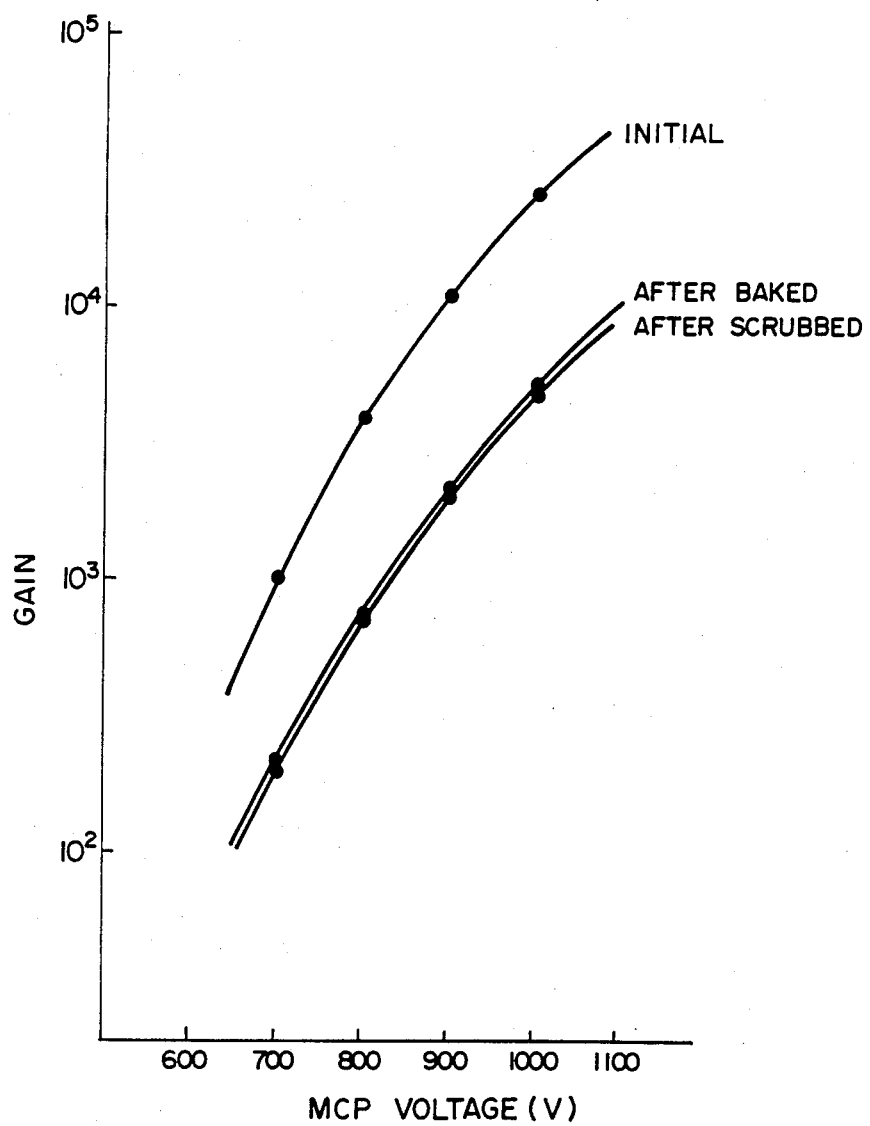
FIG. 4 is a graph showing the gains of the microchannel plate in the respective steps of the fabrication processes in the conventional techniques represented for example by Japanese Publication No. 25934/1982.

FIG. 3 shows the gains of the microchannel plates fabricated by using the type III glass. Curve H in FIG. 1 shows the life of the typical microchannel plate fabricated by using the type III glass.

The second process to fabricate a microchannel plate was modified by using the type III glass containing calcium oxide, and the modified type III glass contains the followings:

| (MODIFIED TYPE III USED IN THE SECOND PROCESS) | |
|---|---|
| Silicon di-oxide (SiO$_2$) | 44% |
| Sodium oxide (Na$_2$O) | 3.0% |
| Potassium oxide (K$_2$O) | 3.0% |
| Lithium oxide (Li$_2$O) | 1.5% |
| Calcium oxide (CaO) | 2.0% |
| Magnesium oxide (MgO) | 2.0% |
| Lead oxide (PbO) | 40.5% |
| Zirconium di-oxide (ZrO$_2$) | 4% |

Curve G in FIG. 1 shows the life of the typical microchannel plate fabricated by using the modified type III glass.

The microchannel plate fabricated by using a number of glass clads consisting of glass materials containing oxides of alkaline earth metals, i.e., magnesium oxide (MgO) and calcium oxide (CaO) has higher gain than that fabricated in accordance with the conventional technique, and is capable of operating stably for a long period of time. The reason may be that alkaline earth metals provide higher secondary electron emissivity ($\delta$). Each alkaline earth metal has larger ionic radius and higher bond energy. Thus, it becomes stable against electron collision.

As described above, the present invention is advantageous over the conventional techniques because the microchannel plate fabricated by using a number of glass claddings, each consisting of glass materials containing oxides of alkaline earth metals, i.e., magnesium oxide (MgO) or a mixture of magnesium oxide (MgO) and calcium oxide (CaO), has higher gain and higher stability than that fabricated in accordance with the conventional technique.

What is claimed is:

1. A process of how to fabricate the microchannel plate consists of:
   sintering the surfaces of the glass fibres bound to form a bundle of said glass fibers, each consisting of a glass core which can be dissolved by acid and a glass cladding covering said glass core, which cannot be dissolved by acid;
   forming a plate-like structure of said glass fiber bundle by slicing said glass fiber bundle along the direction perpendicular to the optical axis thereof;
   dipping said structure into an acid solution so as to dissolve said glass cores which can be dissolved by acid;
   activating the inner surfaces of said microchannel plate, which are formed by dissolving said glass cores which can be dissolved by acid; and
   forming a pair of electrodes at both ends of the plate-like structure;
   wherein said glass cladding which cannot be dissolved solved by acid should contain the followings:

| | |
|---|---|
| Silicon di-oxide (SiO$_2$) | 35 to 50 weight percents |
| Sodium oxide (Na$_2$O) | 1 to 3 weight percents |
| Potassium oxide (K$_2$O) | 1 to 5 weight percents |
| Lithium oxide (Li$_2$O) | 0 to 2 weight percents |
| Magnesium oxide (MgO) | 1 to 5 weight percents |
| Lead oxide (PbO) | 30 to 55 weight percents |
| Zirconium di-oxide (ZrO$_2$) | 0.5 to 7 weight percents. |

2. A process of how to fabricate the microchannel plate consisting of:

sintering the surfaces of the glass fibers bound to form a bundle of said glass fibers, each consisting of a glass core which can be dissolved by acid and a glass cladding covering said glass core, which cannot be dissolved by acid;

forming a plate-like structure of said glass fiber bundle by slicing said glass fiber bundle along the direction perpendicular to the optical axis thereof;

dipping said structure into an acid solution so as to dissolve said glass cores which can be dissolved by acid;

activating the inner surfaces of said microchannel plate, which are formed by dissolving said glass cores which can be dissolved by acid; and forming a pair of electrodes at both ends of said plate-like structure;

wherein said glass cladding which cannot be dissolved by acid should contain the followings:

| | |
|---|---|
| Silicon di-oxide (SiO$_2$) | 35 to 50 weight percents |
| Sodium oxide (Na$_2$O) | 1 to 3 weight percents |
| Potassium oxide (K$_2$O) | 1 to 5 weight percents |
| Lithium oxide (Li$_2$O) | 0 to 2 weight percents |
| Magnesium oxide (MgO) | 1 to 5 weight percents |
| Calcium oxide (CaO) | 1 to 5 weight percents |
| Lead oxide (PbO) | 30 to 55 weight percents |
| Zirconium di-oxide (ZrO$_2$) | 0.5 to 7 weight percents. |

* * * * *